United States Patent

Wood

[11] 4,275,708
[45] Jun. 30, 1981

[54] COMBINED HOT WATER HEATING AND STRIPPING COLUMN FURNACE AND METHOD

[76] Inventor: Harry E. Wood, 6465 Oakland Dr., New Orleans, La. 70118

[21] Appl. No.: 88,934

[22] Filed: Oct. 29, 1979

Related U.S. Application Data

[63] Continuation-in-part of Ser. No. 938,441, Aug. 31, 1978, abandoned.

[51] Int. Cl.$^3$ .............................................. F24H 1/10
[52] U.S. Cl. ...................................... 126/355; 126/359
[58] Field of Search ..................... 126/359, 360 A, 355, 126/350 R, 361, 373, 375, 376, 307 A; 122/5.5; 159/4 B, 16 A; 210/71; 261/98, 94, DIG. 72

[56] References Cited

U.S. PATENT DOCUMENTS

| | | | |
|---|---|---|---|
| 884,223 | 4/1908 | Shipley | 126/359 |
| 1,762,762 | 6/1930 | Coffey | 126/359 X |
| 1,822,274 | 9/1931 | Dibble | 126/307 A |
| 2,651,299 | 9/1951 | Brown, Jr. | 126/307 A |
| 2,759,328 | 8/1956 | Cockrell | 122/5.5 A X |
| 3,190,283 | 6/1965 | Miyahara | 126/359 |
| 3,648,682 | 3/1972 | Bougard | 126/359 |
| 3,826,240 | 7/1974 | Miyahara | 126/355 |

FOREIGN PATENT DOCUMENTS

45-13790  5/1970  Japan ................................... 126/350 R

*Primary Examiner*—Samuel Scott
*Assistant Examiner*—Randall L. Green
*Attorney, Agent, or Firm*—C. Emmett Pugh & Associates, Patent & Trademark Attorneys, Ltd.

[57] ABSTRACT

A direct contact, water heating column furnace for producing non-corrosive, drinking-water-quality heated water comprising a body or shell having at least an upper, heat exchange and stripping compartment and integrally formed and in-line therewith a lower compartment. A grating separates the integrated two compartments and a plurality of heat absorbing and transfer bodies, such as for example, Paul rings, are positioned within the upper compartment on top of the grating. A greater amount and depth of heat absorbing bodies are provided than would be needed merely for heating in order to also strip the water of substantially all its free oxygen to eliminate the corrosive effects of $CO_2$ presence. Cold water is introduced into the furnace by a spray positioned over the heat absorbing bodies with the water running into the lower compartment as it is heated and oxygen-stripped by heating means. The heating means operates at a relatively low temperature free of intense hot spots to avoid $NO_x$ formations and its corrosive effects, with the heating means positioned within the lower compartment being an open, exposed flame with direct flame/water contact. The furnace has water flow directing means positioned within the furnace shell to direct the downward flow of water to a predetermined area in the lower compartment in order to prevent hot spots from forming on the shell of the furnace in the area of the lower compartment. An exhaust stack is provided above the upper compartment for removing the exhaust gas from the furnace with the exhaust stack being formed, in one embodiment, in a generally U-shape configuration. The U-shape configuration acts to prevent back flow of air into the furnace whenever the furnace blowers are shut-off.

32 Claims, 6 Drawing Figures

COMBINED HOT WATER HEATING AND STRIPPING COLUMN FURNACE AND METHOD

CROSS-REFERENCES TO RELATED PATENT APPLICATION

This application is a continuation-in-part of Ser. No. 938,441 filed Aug. 31, 1978 and abandoned, entitled "Hot water Heating Furnace and Method," the full and complete disclosure of which is incorporated herein by reference.

BACKGROUND OF THE INVENTION

This invention related generally to hot water heating column furnaces, and in particular to a new and novel, improved combination hot water heat exchanger and stripper furnace for use as a non-corrosive, drinking-water-quality heating system, and to a corresponding method for providing such a source of drinking-water-quality hot water for use, for example, in copper pipe systems.

Direct contact, heating hot water column furnaces are known in the art but generally are incompatible with conventional copper pipe water systems.

When the products of combustion (mostly carbon dioxide and water) produce cabonic acid, thisalone generally will not attack the copper pipes. Likewise any oxygen in the solution will not attack the copper pipes either, except to the extent of providing a thin protective coating of oxide on the pipe. However, if both the carbonic acid and the oxygen are present in the solution, their combined effect can cause extreme corrosion of the copper pipes by oxidation from the oxygen and its removal by carbonic acid, thus removing copper oxide from the system.

Prior art furnace designs appear to ignore this problem, and the subject invention is thereby directed to a direct contact water heater column which is formed into two chambers with the upper chamber being a combined heat exchanger and oxygen stripping chamber and with the lower chamber being a combustion chamber and reservoir for the hot water that is heated in the furnace, the combustion chamber and its heat source likewise being designed to avoid $NO_x$ and $SO_2$ problems.

Prior art type hot water column heater furnaces using direct or semi-direct flame/water contact, will be described briefly for purposes of a more fuller understanding of the present invention:

(1) The U.S. Pat. No. 3,190,283 which issued on June 22, 1965 to Kingo Miyahara is entitled "Compact Instantaneous Water Heater". This patent discloses a water heater using a central combustion chamber for producing hot gases and utilizes a packing of heat-absorbing material above the combustion chamber. Water is sprinkled over the packing such that the water comes in contact with the heated packing and the hot gases and trickles down to a lower, annularly shaped pick-up trough which directs the water to an outlet pipe. A flue at the top of the heater allows escape of combustion products in the normal manner.

(2) The U.S. Pat. No. 3,826,240, issued July 30, 1974 to Kingo Miyahara is entitled "Direct Contact Water Heater". This patent discloses a device similar in operation to that of the U.S. Pat. No. 3,190,283 and additionally teaches a device that has a water jacket containing some water trickling down which has been deflected by the tapered inner wall of the jacket. The water is made to fall through the combustion chamber after passing through the packing.

(3) The U.S. Pat. No. 884,223, issued Apr. 7, 1908 to A. E. Shipley is entitled "Instantaneous Water Heater". This patent discloses an earlier version of the before mentioned type water heaters and employs a single chamber having an upper heat exchange area containing packing and separated from a lower combustion area by a grid. The sprayed water comes in contact with the hot combustion products as in the above device and collects around the open combustion chamber. The stated purpose of having an inner combustion chamber is to prevent the hot combustion from contacting the heater walls causing heat loss by radiation.

(4) the U.S. Pat. No. 3,648,682 issued Mar. 14, 1972 to Jacques Bougard is entitled "Heater with Combustion Chamber Located Below Fluid Distributing Means". This patent discloses a water heater similar to the above except that the flames are confined within a separate combustion chamber within the column, which chamber is opened only at its bottom, isolating the falling water from direct contact with the flames.

(5) The U.S. Pat. No. 2,759,328, issued Aug. 21, 1956 to C. M. Cockrell is entitled "Pressurized Heater for Producing Hot Process Water in Large Quantities from Scale-Forming Water". This patent teaches another type of direct contact water heater and is provided to show the general state of the art of this type of heater.

None of the before mentioned patents discloses the use of a combination hot water heat exchanger and oxygen stripper furnace to produce a non-corrosive drinking-water-quality heating system.

Thus, it should be understood at the outset that the present invention not only serves as a hot water heater but as an oxygen stripper too, achieving results never heretofore achieved in the hot water heater field producing non-corrosive, drinking-water-quality, heated water.

All of the aforesaid prior art will, it is believed, produce corrosive water, as compared to the non-corrosive, drinking-water-quality achieved in the invention. As is candidly admitted in the Bougard U.S. Pat. No. 3,648,642, "As in all heaters of the above type, the hot liquid is corrosive because of its direct contact with the combustion product which latter contain acid anhydride substances." (Col. 2, lines 28–30). With respect to the heater type of Bougard, it is noted that the Bougard device "relates to the provision of a heater of the type comprising, in a column, a combustion chamber situated below a space equipped with fluid-distributing means, in which space the fluids meet in counter current, the heated liquid descending from one end and the combustion gases rising from the other." (Col. 1, lines 3–8).

SUMMARY DISCUSSION OF THE INVENTION

Thus in order to overcome the problems inherent in the prior art type of devices before mentioned, there has been provided by the subject invention in its preferred embodiments a new and improved direct contact, water heater column which comprises a body and a grid dividing the interior of the body into an upper and lower compartment. The upper compartment contains a plurality of heat absorbing bodies which act in combination as a heat exchanger and also as an oxygen stripping chamber. The lower compartment forms a combination combustion chamber and complete reservoir for storage of the hot water heated in the furnace. A forced draft burner is provided below the grid which allows the combustion products to rise through the heat absorbing bodies at a rate which heats the water and strips most of the dissolved oxygen from it. Cold water is introduced into the furnace through a spray in the upper compartment and the combustion products are vented through a flue having a general U-shape so as to prevent back flow of air when the furnace burner is shut off, thus maintaining an oxygen free atmosphere in the unit.

An inverted conical frustum shell is fixedly attached to the underside of the grating and terminates with an open end within the lower compartment with the heating means being formed to direct the heat to the area inside the inverted conical shell. The inverted conic shell or directing means serves to direct the cold water from the upper compartment to the inside of the conical shell and into the lower compartment in one embodiment of the invention. In a modification of this embodiment there is provided a directing means in the form of a conical frustum, open-ended baffle positioned uprightly and attached to the upperside of the grating to direct the water down the sides of the lower compartment and into the lower compartment storage area. By the use of the directing means, the flame from the burner is contained within an area in the furnace such that the flame is not exposed to the shell of the furnace but is in contact with a layer of water running down the inverted cone or running down the sides of the lower compartment in the modified embodiment.

The combustion system also is designed to avoid the presence of relatively high temperatures or concentrated heat zones or intense hot spots. This is achieved by not using a large number of burners, preferrably only one operating at a relatively low temperature, and by having the flame directly contacted by the water from its initial introduction into the chamber with no flame shields or other means to prevent the water from contacting the flames. This avoids the formation of $NO_x$.

Additionally the formation of $SO_2$ is avoided by using only lighter burning fuels such as natural gas, and the like.

A further aspect of the invention is to produce a flue gas having an outlet temperature leaving the furnace approximately equal to the temperature of the incoming cold water to be heated.

Accordingly it is an object and advantage of the invention to provide a new and novel hot water heat exchanger-stripper furnace to produce a non-corrosive, drinking-water-quality heating system which will have no corrosive effects on, for example, any copper or steel pipes utilized in the system and which in particular avoids any $CO_2$, $NO_x$ or $SO_2$ corrosion problems.

Another object and advantage of the invention is to provide a new and improved direct contact, hot water furnace which utilizes a plurality of elements to obtain a much more improved and efficient furnace wherein the outlet temperature of the flue gas leaving the furnace is at a temperature approximately equal to the temperature of the cold water coming into the furnace through the spray nozzles.

Still yet another object and advantage of the invention is to provide a new and improved combination heat exchanger-stripper furnace which utilizes a new and improved exhaust vent which functions to prevent air from entering into the furnace whenever the furnace blowers are completely shut-off.

Still another object and advantage of the invention is to provide a new and improved hot water furnace which functions as a heat transfer as well as a mass transfer unit to remove the oxygen from the furnace and which provides a constant amount of water vapor moving out of the furnace through the flue stack during shutdown to thereby keep the furnace system purged during non-operation.

Another object and advantage of the invention is to provide a new and novel method of providing a source of drinking-water-quality, hot water for use with copper or steel pipes which utilizes the new and improved furnace described herein the new and novel manner described.

These and other objects and advantages of the invention will become apparent from a review of the drawings of two embodiments of the invention and from a reading of the description of one embodiment and a second, modified embodiment detailed hereinafter.

BRIEF DESCRIPTION OF THE DRAWINGS

For a further understanding of the nature and objects of the present invention, reference should be had to the accompanying drawings, in which like parts are given like reference numerals, and wherein.

DESCRIPTION OF PREFERRED EMBODIMENTS

Figure 1:
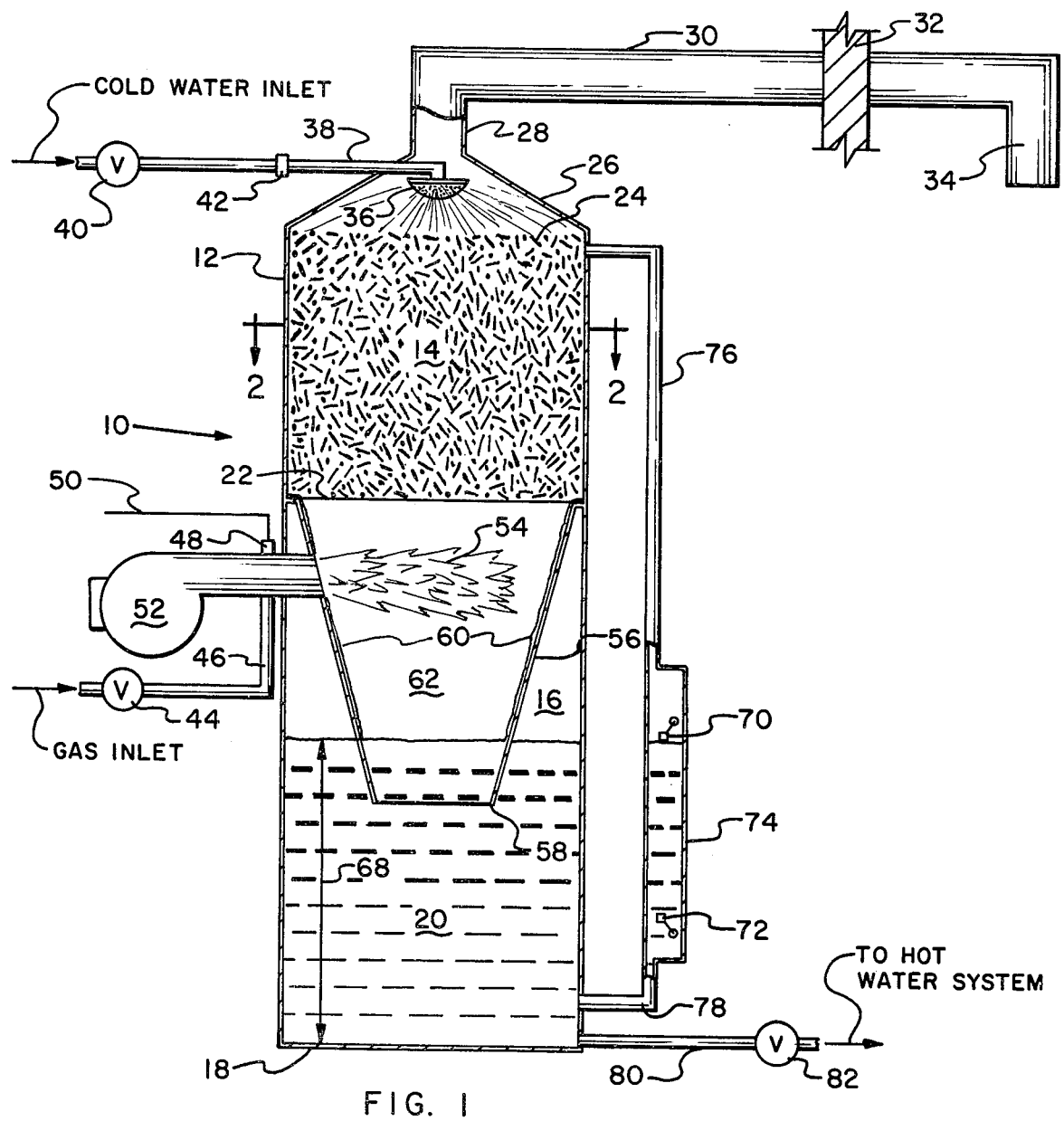
FIG. 1 is a side, sectional view of a first embodiment of the new and improved furnace showing the upper and lower chambers separated by the grating and also showing the new and novel U-shape vent stack.

Referring now to the drawings in general and in particular to FIG. 1 of the drawings, there is shown a first embodiment of the invention's new and novel combination hot water heat exchanger and stripper furnace shown generally by the numeral 10 which comprises an external shell 12 having formed within at least an upper compartment 14 and a lower compartment 16. The external shell 12 is designed with a water-tight bottom 18 which allows the lower compartment 16 to form a hot water storage reservoir for the storage of the total hot water 20 needed in the heat exchanger system.

A grating 22 is positioned between the upper compartment 14 and the lower compartment 16 and is designed to support a plurality of heat absorbing and transfer bodies 24 which are positioned with the upper compartment 14 and on top of the grating 22. The heat absorbing bodies 24 are shown in one form in FIGS. 3 and 4 and will be described more fully hereinafter.

At the upper extremity of the external shell 12 there is formed a tapered, conical section 26 closing off the top of the heat exchanger and terminating in an exhaust pipe 28 which is utilized for removing the exhaust from the furnace to the atmosphere. The exhaust pipe 28 is connected to a horizontal exhaust pipe 30 which passes through the exterior of the building wall 32 in proximity to the heat exchanger 10 of the subject invention. At the termination of the horizontal exhaust pipe 30 there is a downwardly turned exhaust pipe 34 which is open to the atmosphere outside of the external building wall 32. The exhaust pipe 28 in combination with the horizontal exhaust pipe 30 and the downwardly turned exhuast pipe 34 together form a substantially U-shaped exhaust stack which functions to stop any oxygen from coming back into the furnace whenever the furnace blower is shut down during a down cycle. Vapor pressure from the hot water 20 being stored in the lower compartment 16 is sufficient in its constant movement out of the furnace system so that it will keep the furnace purged and prevent unwanted oxygen from entering into the furnace through the U-shaped stack during a furnace shutdown.

Positioned in the tapered conical section 26 is a means for spraying cold water over a plurality of heat absorbing bodies 24 and is constructed in the embodiment shown in FIG. 1 with a spray nozzle 36 fixedly attached to a cold water pipe 38. A main valve 40, indicated with a "V" in the drawing, opens upon receiving a signal from the furnace controller whenever there is a low water level in the lower compartmeht 16. The main valve 40 also is automatically opened prior to the furnace flame being ignited in order to insure a water flow prior to the heating of the furnace.

Positioned between the main valve 40 and the spray nozzle 36 is a paddle switch 42 which sends a signal to the furnace controller to indicate that flow has commenced in the cold water pipe 38 which allows the main gas valve 44 to operate. The main gas valve 44 is connected to the gas inlet 46 and is positioned outside the lower compartment 16 so that it can be ignited by a spark ignition pilot 48 which is connected to the electrical wire 50.

The means for heating the lower compartment 16 and the upper compartment 14 comprises an externally mounted, forced draft gas burner 52, which is mounted on the external shell 12 as shown in FIG. 1 and is designed to direct a flame 54 into the lower compartment in a controlled manner. In the embodiment shown in FIG. 1 of the drawing, there is positioned within the lower compartment 16 means for directing the flow of cold water from the spray nozzle 36 to a predetermined area in the lower compartment 16 in order to prevent hot spots resulting in burn-outs on the external shell 12 in the area of the lower compartment 16. The directing means comprises a conical, inverted frustum shell 56 which is fixedly attached to the underside of the grating 22 and terminates with an open end 58 within the lower compartment 16.

When formed thusly the inverted conical shell 56 serves to direct water from the spray nozzle 36, which water runs downwardly through the upper compartment 14 and also runs downwardly on the internal sides of the upper compartment 14. The conical shell 56 serves as a funnel to funnel this water into the lower compartment 16. The water running down the interior of the conical shell 56 is shown in FIG. 1 of the drawing by the numeral 60 and serves to keep the flame 54 from being exposed to the inside of the external shell 12 in the area of the lower compartment 16. The design of the blower 52 in combination with the spark ignition pilot 48 and the gas inlet pipe 46 is such as to be able to direct the heat from the blower 52 into the area 62 inside the inverted conical shell 56.

Figure 3:
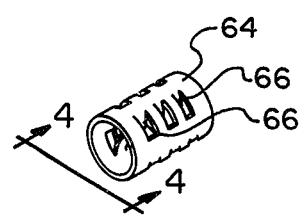
FIG. 3 is a perspective view of the heat absorbing bodies known as "Paul rings"
Figure 4:
FIG. 4 is an end view, taken along line 4—4, showing details of the interior of the "Paul rings"

Referring now to FIGS. 3 and 4 of the drawings and also back to FIG. 1 of the drawings at the same time, there will be described more fully the heat absorbing bodies 24 which are contained in the upper compartment 14 of the furnace 10. FIG. 3 is a perspective view of the heat absorbing bodies known as "Paul rings". The Paul rings are standard in the process industry and applicant makes no claim to Paul rings as his invention but only when used in combination with applicant's new and novel furnace structure. The Paul rings, as shown in FIG. 3 of the drawing and as illustrated with the numeral 64, are formed in an open cylindrical shape with a series of turned-in cuts 66, which can be seen more clearly in FIG. 4 of the drawings, which is an end view taken along line 4—4 of FIG. 3. In the applicant's experimental furnace it was found that Paul rings of approximately $1\frac{1}{2}$ inch diameter were satisfactory, and it is within the spirit and scope of the invention that the Paul rings could, for example, be sized also in the range of approximately $\frac{1}{2}$ inch to 3 inches. The external shell 12 of the applicant's furnace as well as the bottom 18 and the tapered conical section 26 are preferably constructed of stainless steel, and in a similar manner the conical shell 56 positioned within the lower compartment 16 is constructed also of stainless steel as is the grating 22.

The first experimental model of the applicant's furnace utilized a $3\frac{1}{2}$ foot diameter external shell 12 which was approximately nine feet tall from the bottom area to the tapered, conical section 26. The Paul rings contained in the upper compartment 14 were packed to a height of three feet above the grating 22 which provided the best results to remove approximately 90% of the oxygen from the water being introduced into the furnace through the spray nozzle 36. It is noted that, in accordance with standard engineering design practices, procedures and calculations, if one were to design the upper compartment 14 merely to achieve heating, the indicated depth would be only $\frac{3}{4}$ of a foot rather than three feet, a factor of 1:4.

This experimental furnace utilized a 2,000,000 BTU per hour gas burner 52 of the forced draft type. The hot water level 20 in the lower compartment 16, shown by the arrow distance 68, was approximately $3\frac{1}{2}$ feet from the bottom 18 of the furnace. When formed thusly, it was found from experimentation that the furnace had sufficient capacity to supply the total hot water storage necessary in the system in the lower compartment 16. The experimental unit was sized for 30% demand of the total number of people using the system with a 15 minute retention time. This long retention time aids in preventing the burner 52 from having to cycle on and off which would be the standard in prior art types of furnaces. The forced draft blower burner 52 is set up in the control system to be off-on and will come on as a purge to empty the interior of the furnace 10 of accumulated gas prior to the introduction of gas into the system through the valve 44. High water level switch 70 functions in combination with low water switch 72 in an external level control reservoir 74 to maintain the water between the two levels and to provide a minimum running time of the furnace of approximately 10 minutes for best efficiency. The upper portion of the level control reservoir 74 is connected by means of the pipe 76 to the interior of the upper compartment 14, while the lower portion of the level control reservoir 74 is connected by means of the pipe 78 to the interior of the lower compartment 16.

A main hot water outlet pipe 80 is positioned in the lower compartment 16 and the flow of hot water to the hot water system is controlled by a valve 82.

Figure 2:
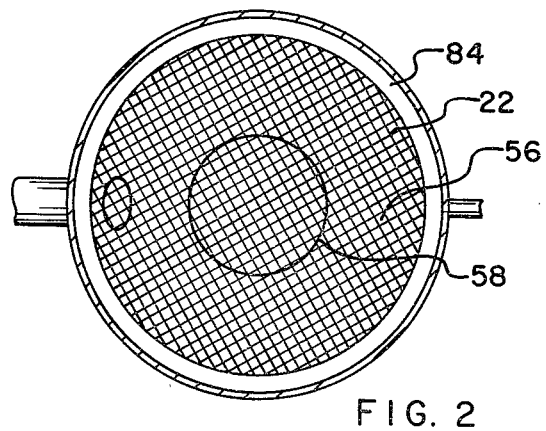
FIG. 2 is a sectional view, taking along line 2—2 of FIG. 1 and showing the grating in place which supports the heat absorbing bodies and separates the two chambers or compartments.

Referring now to FIG. 2 of the drawings, there is shown a section view, taken along line 2—2 of FIG. 1, showing the grating 22 in place in the furnace 10 with the inverted conical shell 56 being shown in position beneath the grating 22. It can be seen in FIG. 2 that the grating 22 terminates in a ring-like solid area 84 which would be welded to the interior of the upper compartment 14. When formed thusly, droplets of water from the spray nozzle 36 that would cascade down the interior of the upper compartment 14 would be directed by the ring-like area 84 through the grating 22 and into the inverted conical shell 56.

By utilizing the applicant's new and novel furnace, it is possible to obtain stack temperatures approaching the inlet water temperature of the cold water being introduced into the furnace through the cold water pipe 38. The Paul rings 64 are sized and packed within the upper compartment 14 in such a manner so as to get the maximum heat transfer so that by the time hot gasses from the flame 54 are carried to the exhaust stack through the upper compartment 14, they will be cooled down to a temperature approximating the inlet temperature of the cold water ranging somewhere between for example 85° and 90° F. in the summer time. By regulating the gas/air ratio of the furnace to come out with little or no oxygen, it is possible to strip maximum oxygen from the cold water being introduced into the furnace through the spray nozzle 36, thereby maintaining an inert atmosphere within the furnace upon shutdown. This results in negligible amounts of air or oxygen entering into the furnace upon a start-up as before mentioned. By locating the furnace level controls on the exterior of the furnace, they are not exposed to the 1,500° to 2,000° gas temperatures within the furnace, and it is possible thereby to use electronic controls to insure a more accurately controlled furnace.

Figure 5:
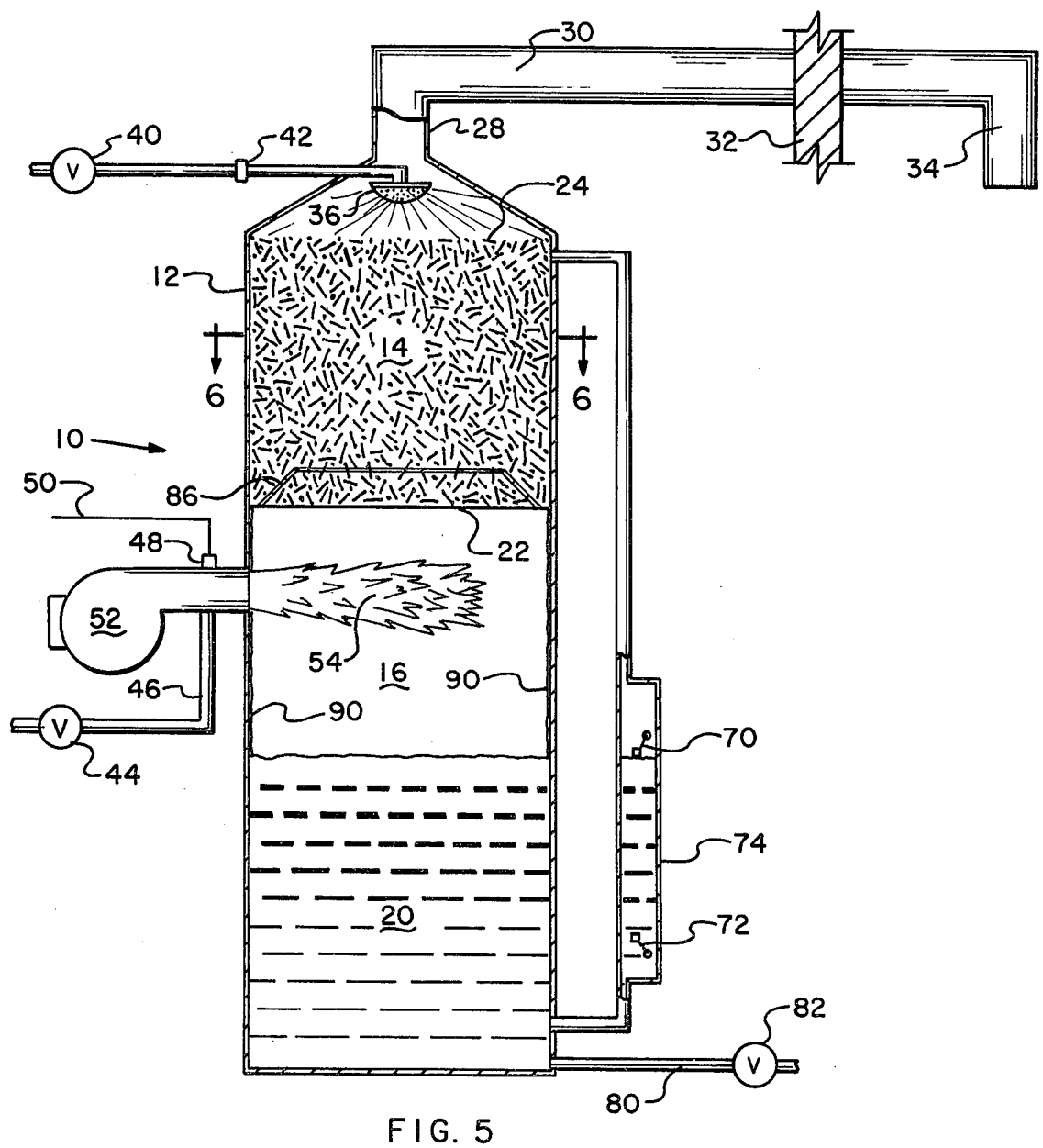
FIG. 5 is a side, sectional view of a generally cylindrically shaped furnace showing a modification of the embodiment of the furnace shown in FIG. 1 of the drawings.
Figure 6:
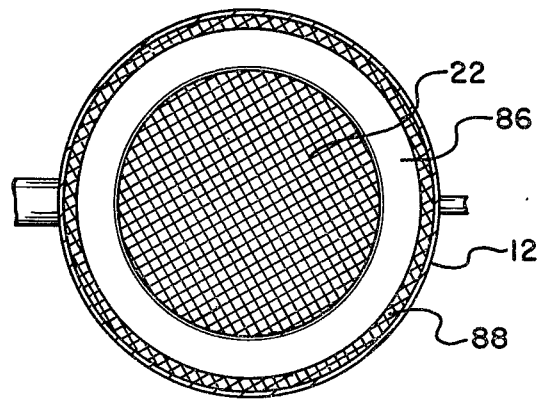
FIG. 6 is a sectional view, taken along line 6—6, showing the conically shaped, open ended, frustum baffle fixedly attached to the upperside of the grating separating the upper and lower compartments of the furnace.

Referring now to FIGS. 5 and 6 of the drawings, there is shown a modification of the embodiment shown is FIGS. 1-4. Here the furnace 10 is constructed basically in a similar manner to the furnace shown in FIG. 1. For purposes of clarity, all of the items of the furnace shown in FIG. 1 are not shown in FIG. 5, and it will be understood that the two furnaces are similar in construction with the exception of the interior construction to be described hereinafter.

Basically the furnace modification shown in FIG. 5 utilizes an upwardly positioned, conical frustum, open-ended baffle 86 which is fixedly attached to the upper side of the grating 22 to direct some of the downwardly flowing water down the sides of the upper compartment 14 into the lower compartment 16. As may be recalled in the furnace shown in FIG. 1, there was formed an inverted, downwardly positioned, conical shell 56, and it will be noted by referring to FIG. 5 that the conical shell 56 has been deleted in favor of the open-ended baffle 86.

By referring to FIG. 6 of the drawings, there is shown a sectional view, taken along line 6—6 of FIG. 5, showing the conically shaped, open-ended frustum baffle fixedly attached to the upper side of the grating 22 which separates the upper compartment 14 from the lower compartment 16. In the embodiment now being described relating to FIGS. 5 and 6, it will be seen that the grating 22 will be extended to the external shell 12 and will be welded thereto by means well known in the art. Thereafter the baffle 86 would be sized and positioned on the grating 22 in such a manner so as to allow a ring-like open area 88 to be exposed between the baffle 86 and the external shell 12.

Thereafter, whenever accumulated droplets of water from the spray nozzle 36 run down the interior of the upper compartment 14, they will pass through the grating in the proximity of the ring-like area 88 and will cascade into the lower compartment 16 to the hot water reservoir 20. By referring to FIG. 5, the cascading water in the area of the lower compartment 16 is shown by the numeral 90 and serves to protect the external shell 12 in the area of the flame from the burner so that hot spots do not develop in the furnace in that area.

The remainder of the furnace modification shown in FIGS. 5 and 6 would be similar to the furnace shown in FIGS. 1 through 4. By utilization of the applicant's invention, there has been provided a new and novel method for providing a source of drinking-water-quality hot water for use with copper or steel pipes which comprises the steps of providing an upper and lower compartmented combination hot water heater/stripper furnace and providing the upper compartment with a plurality of heat absorbing bodies. By introducing a given quantity of cold water over the heat absorbing bodies in the upper compartment and by introducing a quantity of heated gas into the lower compartment, there is provided the new and novel furnace and method which allows the heated gas and air to be removed from the upper compartment through the exhaust stack at a temperature approximately the same as the cold water inlet into the furnace. By providing a U-shaped configuration on the exhaust stack there is provided a downwardly turned portion exterior to the furnace which prevents air flow from entering into the stack from outside the furnace. When the upper and lower compartments utilizing the methods are formed with stainless steel and in the configuration hereinbefore mentioned, it is possible to obtain stack temperatures ranging approximately between 85° F. and 90° F. in the summer time, providing a more dependable source of drinking water quality hot water which may utilized in a copper or steel pipe system of the type common in building construction today.

From the foregoing it can be seen that there has been provided by the new and novel furnace and method a much improved furnace which is simple to operate and is simple in construction and yet achieves all of the objects and advantages desired. It should become apparent from a review of the drawings and from a study of the specification and description of the embodiments of the furnace that many changes can be made in the furnace and in the method described herein without departing from the spirit and scope of the invention. It should be understood that the embodiments shown and described hereinbefore are given by way of illustration only.

Having disclosed the invention, what is claimed is:

1. A hot water heater comprising:
   a combination hot water heat exchanger and stripper furnace means for use in providing a non-corrosive drinking-water quality heated water, comprising:
   a. an external shell structure having integrally formed therein at least two, in-line, upper and lower compartments, said lower compartment forming an open, exposed flame, heating area and said upper compartment forming a combined heat exchange and oxygen stripping area;

b. support means associated with said upper compartment;

c. a plurality of heat absorbing and transfer bodies positioned within said upper compartment and on top of said support means to a depth substantially greater than that needed for sufficient heat exchange and to a depth sufficient for substantially complete oxygen stripping from incoming water allowing for exposure flame combustion gases flowing upwardly through said upper compartment to strip substantially all the free oxygen from the water to substantially eliminate corrosive effects of $CO_2$ presence;

d. water supply means associated with said upper compartment for supplying water over the plurality of heat absorbing bodies, said water thereby being heated and stripped of substantially all its free oxygen, and then falling down into said lower compartment;

e. an exhaust stack positioned above said heat absorbing bodies for removing exhaust gas from said furnace means;

f. exposed flame heating means, associated with said lower compartment, operating at a relatively low temperature free of intense hot spots to avoid $NO_x$ formations and its corrosive effects for heating said lower compartment and said upper compartment and for producing gases flowing upwardly through said upper compartment to strip the free oxygen from the water being heated; and g. directing means, associated with one of said compartments, for directing the flow of water to a predetermined area in the lower compartment in order to prevent hot spots resulting in burn outs on the shell in the area of the lower compartment.

2. The hot water heater as defined in claim 1, wherein said directing means includes a downwardly extending wall defining a generally continuous surface over which water flows, said wall including at least one flame orifice from which fuel is emitted and combusted producing said exposed flame heating means, the area immediately above and to the sides of said orifice being exposed to water falling from said upper compartment, the flames from said orifice being completely exposed to the falling water.

3. The hot water heater as defined in claim 1, wherein said heat absorbing bodies are stacked up upon one another to a depth at least of the order of three feet.

4. The hot water heater as defined in claim 1, wherein said structure is formed of stainless steel.

5. The hot water heater as defined in claim 1, wherein said plurality of heat absorbing bodies comprises Paul rings.

6. The hot water heater as defined in claim 1, wherein said water supply means comprises a spray nozzle located above said heat absorbing bodies and below said exhaust stack and in the central portion of said upper compartment.

7. The hot water heater as defined in claim 1, wherein said exhaust stack is formed in substantially an inverted U-shape having an outlet turned downwardly.

8. The hot water heater as defined in claim 1, wherein said heating means comprises a forced draft gas burner located on the outside of said structure and being designed to direct a flame into said lower compartment in a controlled manner.

9. The hot water heater as defined in claim 1, wherein said directing means comprises a conical, inverted, frustum shell fixedly attached to the underside of said support means and terminating with an open end within said lower compartment, said heating means being formed also to direct the heat to the area inside the inverted conical shell, said directing means serving to direct the falling water to the inside of the conical shell and into the lower compartment.

10. The hot water heater as defined in claim 1, wherein said directing means comprises a conical frustum open-ended baffle fixedly attached to the upperside of said support means to direct the falling water down the sides of the lower compartment and into the lower compartment.

11. A method for providing a source of non-corrosive, drinking-water-quality hot water, useable for example with copper and steel pipes, comprising the following steps:

a. providing a hot water column furnace having two integrated, in-line, upper and lower compartments, with the upper compartment containing a plurality of heat absorbing and transfer bodies, water supply means at its top for supplying water to fall down through said bodies and into said lower compartment to be heated, with the lower compartment having an exposed, open burning flame source for heating said bodies and the water with the resulting combustion gases flowing up through the column and exhausted out through an exhaust system; and b. allowing the water to directly contact the flame and stripping substantially all of the free oxygen from the falling water by providing substantially more of said heat absorbing and heat transfer bodies than is needed merely for sufficient heat transfer to also achieve substantially complete oxygen stripping from the incoming water, whereby the potential corrosive effects of any $CO_2$ present in the water is eliminated.

12. The method of claim 11, wherein there is included the further step of c. operating said source of combustion gases at a relatively low temperature free of any intense hot spots to avoid $NO_x$ formations and its corrosive effects.

13. The method of either claims 11 or 12, wherein there is included the further step of d. burning only relatively light fuels, such as for example natural gas, propane and the like, to avoid the formation of $SO_2$ problems.

14. The method of claim 12, wherein in step "c" there is included the further step of keeping the maximum flame temperature at a temperature less than approximately 1,900° F.

15. The method of claim 11, wherein in step "a" there is included the further step of maintaining the exhaust system temperature in the range of approximately 85°-90° F. in summer time.

16. A hot water heater comprising:

a combination hot water heat exchanger and stripper furnace means for use in providing oxygen stripped, heated water, comprising:

a. an outer structure having formed therein at least two, in-line, upper and lower compartments, said lower compartment forming a heating area and said upper compartment forming a combined heat exchange and oxygen stripping area;

b. support means associated with said upper compartment;

c. a plurality of heat absorbing and transfer bodies positioned within said upper compartment and on top of said support means to a depth substantially greater than that needed for sufficient heat exchange and to a depth sufficient for substantially complete oxygen stripping from incoming water allowing combustion gases flowing upwardly through said upper compartment to strip substantially all the free oxygen from the water to substantially eliminate corrosive effects of $CO_2$ presence;

d. water supply means associated with said upper compartment for supplying water over the plurality of heat absorbing bodies, said water thereby being heated and stripped of substantially all of its free oxygen, and then falling down into said lower compartment; and e. an exhaust system positioned above said heat absorbing bodies for removing exhaust gas from said furnace means; and f. heating means, associated with said lower compartment, for producing combustion gases flowing upwardly through said upper compartment to strip the free oxygen from the water being heated.

17. The heater as defined in claim 16, wherein there is further included:

g. directing means, associated with one of said compartments, for directing the flow of water to a predetermined area in the lower compartment in order to prevent hot spots resulting in burn outs on the structure in the area of the lower compartment.

18. The hot water heater as defined in claim 17, wherein said heating means comprises a fuel burning, exposed flame heating means located in said lower compartment and wherein said directing means includes a downwardly extending wall defining a generally continuous surface over which water flows, said wall including at least one flame orifice from which fuel is emitted and combusted producing said exposed flame heating means, the area immediately above and to the sides of said orifice being exposed to water falling from said upper compartment, the flames from said orifice being completely exposed to the falling water.

19. The hot water heater as defined in claim 17, wherein said directing means comprises a conical, inverted, frustum shell fixedly attached to the underside of said support means and terminating with an open end within said lower compartment, said heating means being formed also to direct the heat to the area inside the inverted conical shell, said directing means serving to direct the falling water to the inside of the conical shell and into the lower compartment.

20. The hot water heater as defined in claim 17, wherein said directing means comprises a conical frustum open-ended baffle fixedly attached to the upperside of said support means to direct the falling water down the sides of the lower compartment and into the lower compartment.

21. The heater as defined in claim 16, wherein said heating means is operating at a relatively low temperature free of intense hot spots to avoid $NO_x$ formations and its corrosive effects for heating said lower compartment and said upper compartment.

22. The hot water heater as defined in claim 16, wherein said heat absorbing bodies are stacked up upon one another to a depth at least of the order of three feet.

23. The hot water heater as defined in claim 16, wherein said structure is formed of stainless steel.

24. The hot water heater as defined in claim 16, wherein said plurality of heat absorbing bodies comprise Paul rings.

25. The hot water heater as defined in claim 16, wherein said water supply means comprises a spray nozzle located above said heat absorbing bodies and below said exhaust system and in the central portion of said upper compartment.

26. The hot water heater as defined in claim 16, wherein said exhaust system is a stack formed in substantially an inverted U-shape having an outlet turned downwardly.

27. The hot water heater as defined in claim 16, wherein said heating means comprises a forced draft gas burner located on the outside of said structure and being designed to direct a flame into said lower compartment in a controlled manner.

28. A method of providing a source of oxygen stripped, heated water, comprising the following steps:

a. providing a hot water column furnace having two in-line, upper and lower compartments, with the upper compartment containing a plurality of heat absorbing and transfer bodies, water supply means at its top for supplying water to fall down through said bodies and into said lower compartment to be heated, with the lower compartment having a source of combustion gases for heating said bodies and the water with the combustion gases flowing up through the column and exhausted out through an exhaust system; and b. allowing the water to directly contact the combustion gases and stripping substantially all of the free oxygen from the falling water by providing substantially more of said heat absorbing and heat transfer bodies than is needed merely for sufficient heat transfer to also achieve substantially complete oxygen stripping from the incoming water, whereby the potential corrosive effects of any $CO_2$ present in the water is eliminated.

29. The method of claim 28, wherein in step "a" there is included the further step of maintaining the exhaust system temperature in the range of approximately 85°–90° F. in summer time.

30. The method of claim 28, wherein there is included the further step of c. operating said source of combustion gases by burning fuel at a relatively low temperature free of any intense hot spots to avoid $NO_x$ formations and its corrosive effects.

31. The method of claim 30, wherein there is included the further step of d. burning only relatively light fuels, such as for example natural gas, propane and the like, to avoid the formation of $SO_2$ problems.

32. The method of claim 30, wherein in step "c" there is included the further step of keeping the maximum flame temperature of the burning fuel at a temperature less than approximately 1,900° F.

* * * * *